United States Patent [19]
Gerber et al.

[11] Patent Number: 5,976,632
[45] Date of Patent: *Nov. 2, 1999

[54] DRY PROCESS GUNNING OF REFRACTORY CASTABLE

[75] Inventors: Jerry Gerber, Burlinton, Canada; Jeffrey E. Bogan; Samuel B. Bonsall, III, both of State College, Pa.

[73] Assignee: North American Refractories Co., Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/816,567

[22] Filed: Mar. 13, 1997

[51] Int. Cl.⁶ .............................. B05D 1/02; B05D 1/34; F27D 1/16
[52] U.S. Cl. .................. 427/426; 427/421; 427/427; 264/30
[58] Field of Search ...................................... 427/421, 426, 427/427; 118/300; 264/30, 36

[56] References Cited

U.S. PATENT DOCUMENTS

| | | | |
|---|---|---|---|
| 4,421,797 | 12/1983 | Koehne | 427/403 |
| 4,461,789 | 7/1984 | Takashima | 427/426 |
| 4,683,151 | 7/1987 | Hamaguchi et al. | 427/397.8 |
| 4,751,204 | 6/1988 | Kyoden et al. | 501/89 |
| 4,816,155 | 3/1989 | Linderman | 210/459 |
| 4,981,731 | 1/1991 | Yorita et al. | 427/426 |
| 5,549,745 | 8/1996 | Langenohl et al. | 106/692 |
| 5,628,940 | 5/1997 | Allison | 264/30 |

*Primary Examiner*—Shrive Beck
*Assistant Examiner*—Michael Barr
*Attorney, Agent, or Firm*—Mark Kusner

[57] ABSTRACT

A process for applying a refractory castable onto a surface, comprising the steps of: (a) introducing metered amounts of a clay-free, dry refractory castable into a delivery hose, the dry refractory castable having an alumina content of about 40–95%; (b) conveying the dry refractory to a dispensing assembly under pneumatic pressure; (c) introducing water and a set modifying admixture into the dry refractory prior to dispensing the refractory castable from the dispensing assembly; and (d) spraying the hydraulic refractory castable onto a surface.

5 Claims, 4 Drawing Sheets

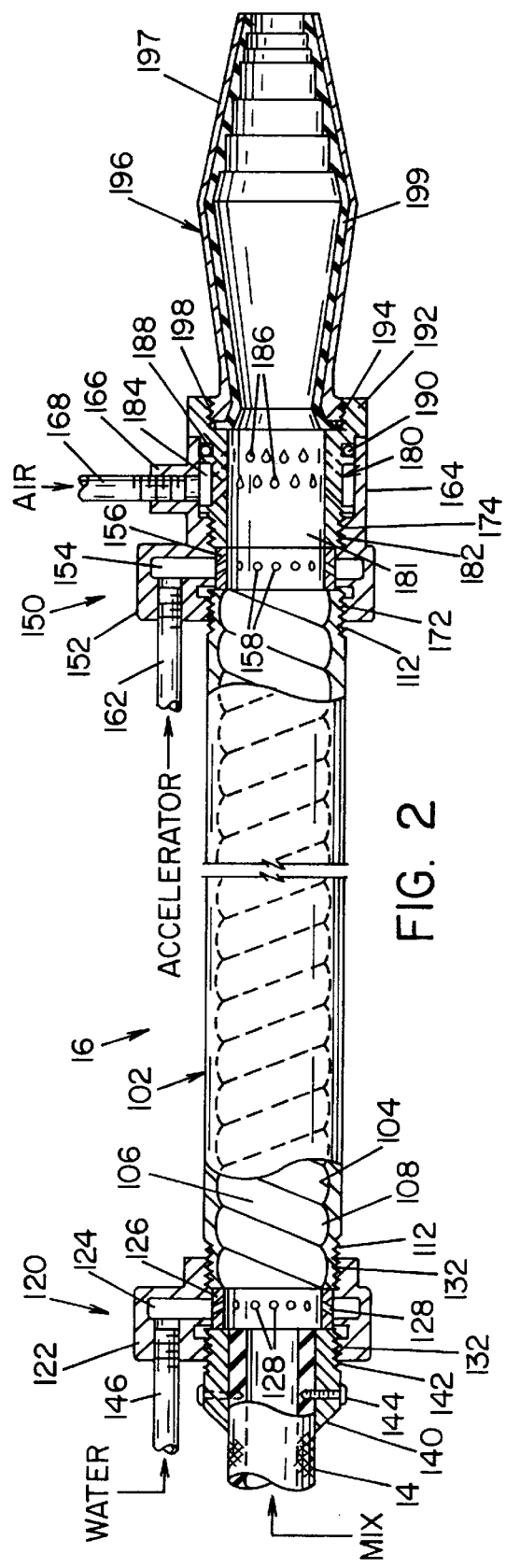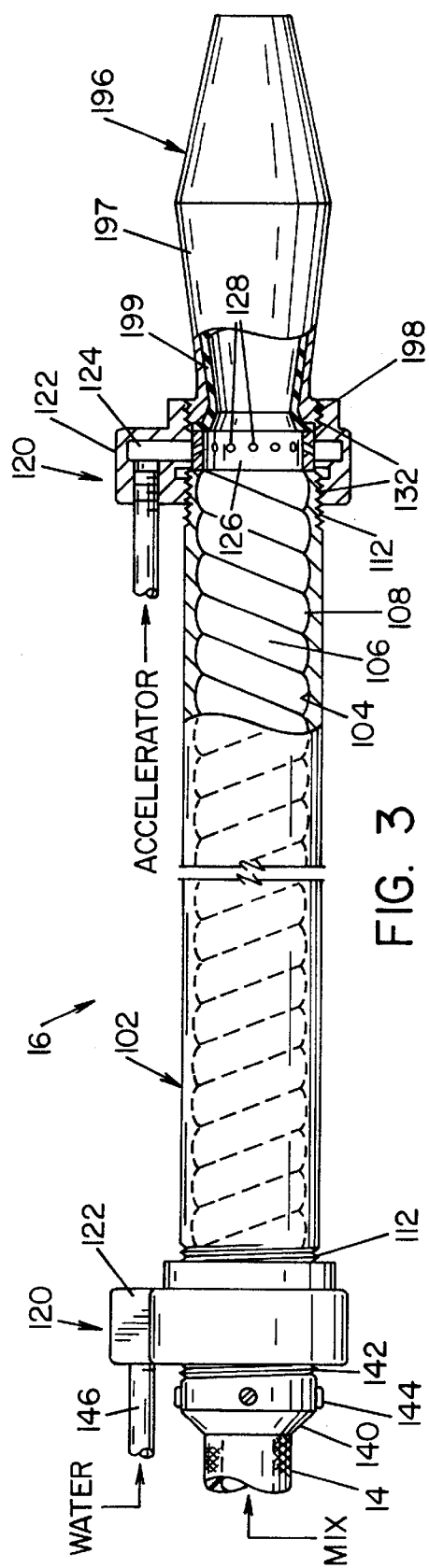

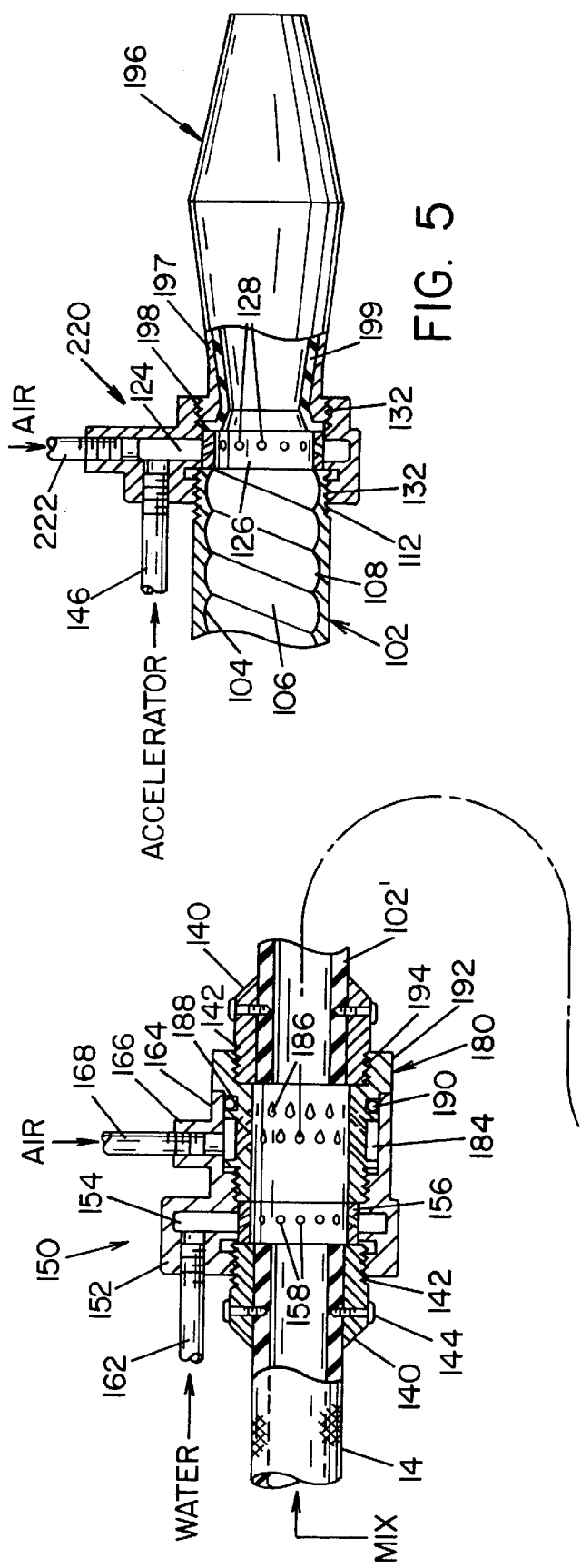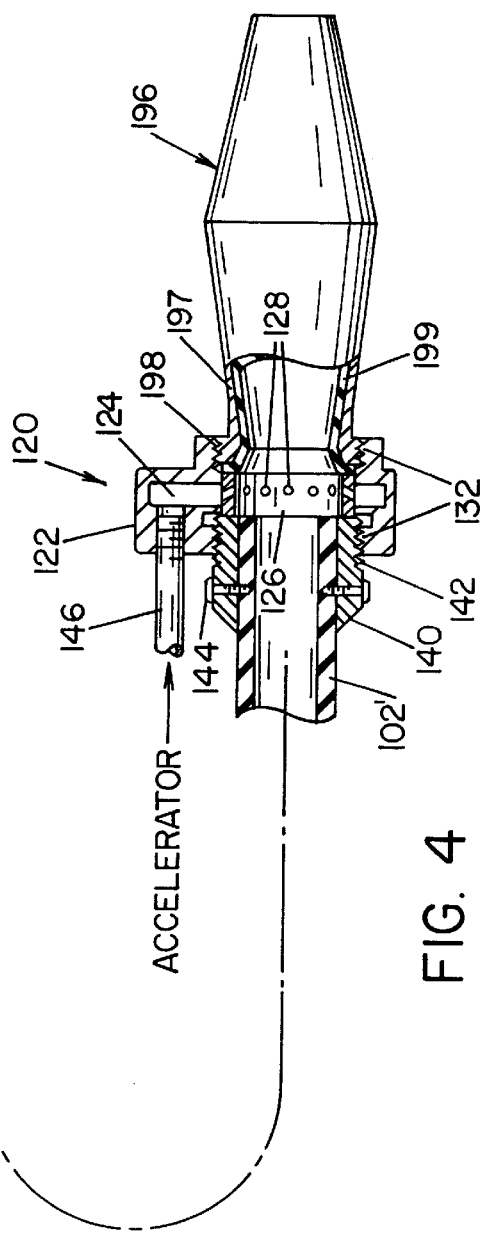

DRY PROCESS GUNNING OF REFRACTORY CASTABLE

FIELD OF THE INVENTION

The present invention relates generally to techniques for applying refractory materials to the surface of a structure, and more particularly to a dry process gunning technique for applying a refractory castable.

BACKGROUND OF THE INVENTION

A refractory castable is generally defined as a combination of refractory grains and a suitable amount of a bonding agent that, after the addition of proper liquid, becomes rigid as a result of chemical action. Refractory castables generally include alumina aggregate together with a hydraulic-setting cement, and are classified based upon the amount of cement contained therein. For example, a conventional castable refractory will contain hydraulic-setting cement and have a total lime (CaO) content greater than 2.5% on a calcined basis. A low-cement castable refractory would have a total lime (CaO) content of between about 1% to 2.5% on a calcined basis. Ultra low cement castable refractories have a total lime (CaO) content of between about 0.2% to 1% on a calcined basis.

In recent years, the shotcreting of refractory castable has become a major method of installation of refractory linings in steel, non-ferrous metal, chemical, mineral and ceramic processing plants. Refractory castable shotcreting is performed by mixing a refractory material with water to provide a material having a pumpable consistency. After mixing, the refractory is delivered to a pumping device, such as a swing-valve pump, to convey the refractory through a delivery hose to a nozzle. At the nozzle, an accelerating admixture is added to the castable refractory to initiate setting of the refractory so that when sprayed on a wall or surface to be lined, the refractory does not slump or sag. The equipment required to shotcrete refractory castables is relatively expensive, and requires significantly more set-up and clean-up time as compared to a conventional dry gunning process.

Gunning is a technique wherein a special refractory "gunning mix" is transported through a delivery hose by pneumatic means to a nozzle where water (and possibly additional air) is (are) added to the refractory mix immediately prior to applying to a surface. Importantly, gunning mixes are generally granular refractory mixes specifically prepared for application with air displacement guns. A gun mix is made up of three basic ingredients: aggregate, clays and binders. The clays are added to the gun mix to increase stickiness and to prevent slumping of the refractory, reduce rebound during spraying and to expand the acceptable water ranges. Stated another way, clay is typically added to a gun mix to provide it with the physical properties which would enable it to be conveyed in a dry state through the delivery hose and to adhere to the surface to be lined when water is added immediately prior to spraying.

The ability to dry process gun a refractory greatly reduces the cost in equipment and set-up and clean-up time. A problem with such a process, however, is that by adding clay, or other like materials, to a refractory, the physical properties of the refractory are adversely affected. Basically, clay reduces the overall refractoriness of the material and provides a less desirous lining than could be achieved by a refractory castable.

The present invention overcomes the drawbacks inherent to each system and provides a method of applying a refractory castable by a dry gunning process.

SUMMARY OF THE INVENTION

In accordance with the present invention, there is provided a process for applying a refractory castable onto a surface comprising the steps of:

(a) introducing specific amounts of a clay-free, dry refractory into a delivery hose;

(b) conveying the dry refractory material to a dispensing nozzle assembly under pneumatic pressure, said refractory castable comprised by weight of about 60–96% of refractory aggregate, refractory powders and superfine powders, about 0–40% calcium aluminate and about 0–2% dispersant;

(c) introducing water and a set modifying admixture into the dry refractory castable prior to dispensing the refractory castable from the dispensing nozzle to create a hydraulic refractory castable; and (d) spraying the hydraulic refractory castable onto a surface.

In accordance with another aspect of the present invention, there is provided a process for applying a refractory castable to a surface comprising the steps of:

(a) introducing into a delivery hose a metered amount of a clay-free, dry refractory castable having an alumina content of about 60 to 80% by weight;

(b) conveying the dry refractory under pressure to a dispensing assembly;

(c) introducing metered amounts of water and a set modifying admixture into the dry refractory prior to dispensing the refractory from the dispensing assembly to create a hydraulic refractory castable, the water and set modifying admixture added in amounts to give the cured refractory castable a modulus of rupture greater than 2000 psi after heating to temperatures above 1500° F.; and (d) spraying said hydraulic refractory castable onto a surface.

In accordance with a further aspect of the present invention, there is provided a nozzle assembly for receiving a dry refractory material under pressure and for spraying a hydraulic wetted refractory material, the nozzle assembly comprised of a tubular member having a receiving end, a dispensing end and a continuous internal passage extending through said member; a first fluid dispensing member having attachment means for securing the first fluid dispensing member to the receiving end of the tubular member, connection means for connecting the fluid dispensing member with a source of pressurized fluid, an internal cavity in alignment with the passage in the tubular member when the first fluid dispensing member is attached to the tubular member, and passage means within the member for communicating the source of pressurized fluid with the internal cavity; and a second fluid dispensing member having attachment means for securing the second fluid dispensing member to the dispensing end of the tubular member, connection means for connecting the second fluid dispensing member to a source of pressurized fluid and a source of pressurized gas, an internal cavity in alignment with the passage in the tubular member when the second fluid dispensing member is attached to the tubular member, and passage means within the second fluid dispensing member for communicating the source of pressurized fluid and the source of pressurized gas with the passage; and nozzle means attached to the second fluid dispensing member.

It is an object of the present invention to provide a method of applying a refractory castable.

Another object of the present invention is to provide a method of applying a refractory castable wherein the refractory castable is conveyed in a dry state to a dispensing nozzle.

Another object of the present invention is to provide a process as described above wherein the equipment necessary to carry out such process are less expensive in cost and set-up time than conventional wet process shotcreting equipment.

Another object of the present invention is to provide a process for dry gunning a refractory castable.

Another object of the present invention is to provide a refractory dispensing assembly for receiving a dry refractory castable and for spraying such refractory castable in a wetted state.

A still further object of the present invention is to provide a refractory dispensing assembly having modular components.

These and other objects and advantages will become apparent from the following description of a preferred embodiment of the present invention taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 2 is an enlarged, partially sectioned, view of a gunning nozzle according to the present invention;

FIG. 3 is a view of a gunning nozzle illustrating an alternate embodiment of the present invention;

FIG. 4 is a view of a gunning nozzle illustrating a third embodiment of tile present invention;

FIG. 5 is a view of a gunning nozzle illustrating an alternate embodiment of the present invention.

DETAILED DESCRIPTION OF PREFERRED EMBODIMENTS

Figure 1:
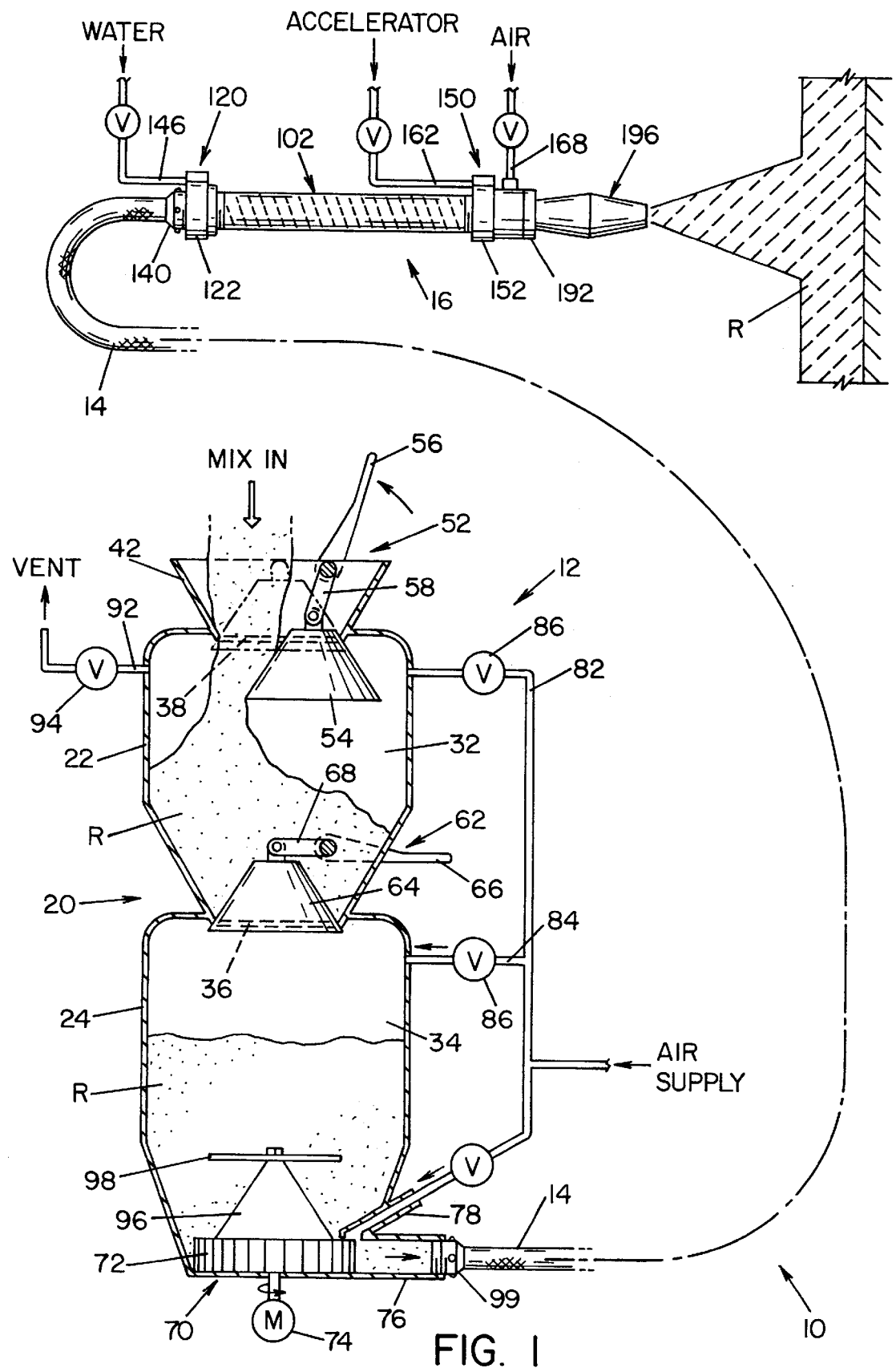
FIG. 1 is a schematic representation of dry process gunning equipment for use in accordance with the present invention.

Referring now to the drawings wherein the showing is for the purpose of illustrating preferred embodiments of the invention only, and not for the purpose of limiting same, FIG. 1 schematically illustrates an apparatus 10 for dry gunning a refractory castable. Apparatus 10 is generally comprised of a refractory gun assembly 12, a transfer hose 14 and a nozzle assembly 16. Gun assembly 12, as hereinafter described, is conventionally known, and in and of itself forms no part of the present invention. Gun assembly 12 is basically comprised of a barrel 20 having an upper barrel portion 22 and a lower barrel portion 24. Upper barrel portion 22 defines an upper chamber 32 which communicates with a lower chamber 34 defined by lower barrel portion 24 by means of an opening 36 defined therebetween. A cylindrical opening 38 is defined at the upper end of upper barrel portion 22. A chute or funnel 42 is provided about cylindrical opening 38. A stopper assembly 52 is provided at the upper end of upper barrel portion 22 to open and close opening 38. Stopper assembly 52 is comprised of a stopper 54, a handle 56 and a linkage 58. Handle 56 and linkage 58 are operable to move stopper 54 between a first position (shown in phantom in FIG. 1) closing opening 38 and a second position allowing access to upper chamber 32. A similar stopper assembly, designated 64, is provided to open and close opening 36 defined between upper barrel portion 22 and lower barrel portion 24. A metering device 70 is provided at the bottom of lower barrel portion 24. Metering device 70 includes a metering wheel 72 driven by a motor 74, schematically illustrated in FIG. 1. Metering wheel 72 is operable to convey fixed amount of refractory material from chamber 34 to a conduit 76 aligned with metering wheel 72. An air line 78 is disposed to be in registry with metering wheel 72 and conduit 76 to pressurize the refractory material metered out by metering wheel 72. Air lines 82, 84 are also connected to upper and lower barrel portions 22, 24, respectively, to allow pressurization of chambers 32, 34. A control valve 86 is provided on each of air lines 82, 84 to control pressure to tipper barrel portion 22 and lower barrel portion 24 and to conduit 76. A release vent line 92 having a control valve 94 is provided on upper barrel portion 22 to relieve pressure within upper chamber 32. A conical deflector 96 is provided on the upper surface of metering wheel 72 to direct refractory material to the peripheral edges of metering wheel 72. A mixing blade 98 is also provided to rotate with metering wheel 72 to mix and distribute the refractory material.

Gun assembly 12, as heretofore described, is a conventionally-known, continuous-feed gun. Dry refractory material, designated "R" in FIG. 1, is typically inserted into upper barrel portion 22 by moving stopper 54 to an open position to allow refractory material R to be poured down chute 42 into upper chamber 32. When gun assembly 12 is initially being filled with dry refractory material, lower stopper assembly 62 is also in an open position to allow the refractory material to drop into lower chamber 34. When chambers 32, 34 are filled, stopper 54 is moved to close upper opening 38 in upper barrel portion 22. Stopper 64 remains in an open position allowing refractory from upper chamber 32 to fall into lower chamber 34 through opening 36. Air pressure is established in chambers 32, 34 by control of air lines 82, 84 by valves 86, to force refractory material to metering wheel 72.

When additional refractory material R is required in gun assembly 12, lower stopper 64 is moved to a closed position and the pressure within upper chamber 32 is released by a vent line 92 through use of control valve 94. With the pressure in upper chamber 32 released, tipper stopper 52 may be moved to an opened position to allow additional refractory material R to be poured into upper chamber 32. Once upper chamber 32 is filled, upper stopper 54 is moved to a closed position and valve 86 is opened to pressurize upper chamber 32. Lower stopper assembly 62 is then opened to allow refractory material R contained within upper chamber 32 to fall into lower chamber 34. By repeating the foregoing procedure, refractory material R may be continuously fed into gun assembly 12.

As indicated above, a gun assembly 12 as heretofore described is conventionally known, and in and of itself, forms no part of the present invention, it being described as a device for carrying out a method of applying a refractory castable according to the present invention.

Transfer hose 14 is connected to gunning assembly 12 to convey the dry refractory material R from gun assembly 12 to nozzle assembly 16. In the embodiment shown, transfer hose 14 is attached to a connector 99, which is attached by conventional means to conduit 76 of gun assembly 12.

Transfer hose 14 is preferably a conventional hose having an inner diameter of approximately 1 to 4 inches.

According to one aspect of the present invention, dispensing assembly 16 is preferably comprised of modular components, wherein the position and use of the respective components may be changed to produce different dispensing structures and different spraying (i.e., application) characteristics.

Referring now to FIG. 2, a preferred embodiment of dispensing assembly 16 is shown. Dispensing assembly 16 is basically comprised of a conduit portion 102 having a fluid dispensing assembly 120 at one end, and a fluid and gas dispensing assembly 150 at the other end. In the embodiment shown, conduit portion 102 is generally a tubular body having an inner surface 104 that defines a generally cylindrical internal passage 106 through conduit 102. Inner surface 104 of conduit 102 has a surface profile creating a rifling or spiraling pattern along passage 106. In the embodiment shown, conduit 102 is a cylindrical pipe having a helical, semi-circular groove 108 found along inner surface 104 to spiral along the length thereof. The ends of conduit 102 include external threads 112 for attaching conduit 102 to fluid dispensing assemblies 120, 150, as will be described in greater detail below.

Fluid dispensing assembly 120 is generally comprised of an annular housing 122 formed to have a annular cavity 124 therein. An annular dispensing ring 126 is disposed within housing 122 adjacent cavity 124. Ring 126 includes a plurality of apertures 128 extending through ring 126 to communicate with cavity 124. Apertures 128 are preferably oriented along the intended direction of flow of the refractory material. Both ends of housing 122 includes internal threads 132 of like size. Threads 132 are dimensioned to receive one end of conduit 102 or a connector 140 that is provided to attach transfer hose 14 to housing 122. To this end connector 140 includes a threaded portion 142 having a thread size equal to and matching thread portion 112 on conduit 102. In the embodiment shown, connector 140 is attached to transfer lose 14 by conventional fasteners 144. Housing 122 is dimensioned to receive a fluid feed line, conduit or hose, designated 146 in the drawings, which is in communication with cavity 124.

Referring now to the right-hand side of FIG. 2, fluid dispensing assembly 150 is generally similar to fluid dispensing assembly 120. Like fluid dispensing assembly 120, fluid dispensing assembly 150 includes a housing 152 having an inner annular cavity 154 and a dispensing ring 156. Dispensing ring 156 includes a plurality of apertures 158 extending therethrough communicating with cavity 154 within housing 152. A feed line 162 communicates with cavity 154 of housing 152. Unlike fluid dispensing assembly 120, fluid dispensing assembly 150 includes a cylindrical housing extension 164 extending from housing 152. Housing extension 164 includes a nipple 166 dimensioned to receive a gas line, designated 168 in FIG. 2. One end of housing 152 includes internal threads 172 dimensioned to receive threads 112 on conduit 102 or threaded portion 142 of a connector 140. Housing extension 164 includes an internal threaded portion 174 for attachment to a bushing 180. Bushing 180 is generally cylindrical in shape and defines an inner cylindrical bore 181. Bushing 180 includes a threaded portion 182 dimensioned to matingly engage internal threads 172 of housing 152. An annular channel or groove 184 is formed in the outer surface of bushing 180 to be in registry with gas line 168. Apertures 186 extend through the wall of bushing 180 to communicate groove 184 with inner bore 181. Apertures 186 are preferably oriented to inject gas in the intended direction of flow of the refractory material. A second annular groove 188 is formed in the outer surface of bushing 180. Groove 188 is dimensioned to receive an O-ring 190 to form a seal between the outer end of bushing 180 and housing extension 164, as is conventionally known. Bushing 180 includes an annular flange 192 at the end thereof. Flange 192 includes an inner threaded portion 194 dimensioned for attaching bushing 180 to conduit 102 or to a dispensing nozzle, designated 196. Nozzle 196 has a threaded end 198, having threads preferably sized and dimensioned as threaded portion 112 of conduit 102 and threaded portion 142 of connector 140 so as to allow attachment to each. Nozzle 196 preferably has a rigid outer shell 197 and an inner lining 199 of a hard abrasive-resistant rubber material.

Referring now to the operation of the present invention, apparatus 10 is adapted for applying a refractory castable to a surface. As used herein, the term "refractory castable" shall refer to a refractory material comprised of refractory grains, particularly aggregate, powders and superfine powders, and calcium aluminate cement, the refractory material being free of clay or other like materials. The refractory castable is preferably comprised of about 65–96% refractory materials, including aggregates, powders and superfine powders. More specifically, the refractory material is preferably comprised by weight of about 55–65% refractory aggregates, about 10–25% refractory powders and about 0–6% superfine refractory powders. In addition to the refractory material, the refractory castable includes about 0–40% calcium aluminate cement, the preferred range being between 4 and 8%. The composition also includes about 0–2% dispersing agent, wherein the preferred range for the dispersing agent is about 0.15–0.5%. Importantly, the refractory castable is clay-free and is originally mixed in a dry state.

A refractory material as heretofore described is preferably inserted within apparatus 10 with no pre-dampening. A set amount of the dry refractory is metered at a predetermined rate into conduit 76 by metering wheel 72. Pneumatic pressure from line 78 forces the metered refractory into transfer hose 14. Under pneumatic pressure, the dry refractory castable is conveyed through transfer hose 14 to the dispensing assembly 16. Referring now to FIG. 2, water is added to the dry refractory through fluid dispensing ring 120. Water is fed through feed line 146, preferably by a conventional, adjustable metering pump (not shown). The flow rate of water is adapted to match the flow rate of the refractory in transfer hose 14. The water from feed line 146 is injected into cavity 124 of housing 122, and is jetted into the dry refractory material through apertures 128 in ring 126. In this respect, apertures 128 in ring 126 are preferably dimensioned, relative to the pressure established within cavity 124, to produce jet streams of the water through apertures 128 to increase the interaction between the water and refractory material. As the water and refractory material combine, they are forced through conduit 102. The internal surface profile of conduit 102 causes a tumbling or mixing action between the refractory material and water, thus mixing the refractory into a hydraulic refractory castable. At fluid dispensing assembly 150, a set modifying admixture is added to the hydraulic refractory castable. The set modifying admixture is preferably selected from the group consisting of hydrated lime, sodium silicate and a combination of hydrated lime and calcium chloride. The set modifying admixture is fed to fluid dispensing ring 150 through feed line 162. Feed line 162 is preferably connected to a conventional, adjustable metering pump (not shown) that is adapted to feed the admixture at a rate to match the flow of the refractory through conduit 102. As set forth above, metering pumps of this type are conventionally-known. The set modifying admixture is fed through feed line 162 into cavity 154 of housing 152. From cavity 154 the admixture is forced through apertures 158 in ring 156 into the refractory. The set modifying admixture is preferably introduced at a pressure, and apertures 158 are preferably dimensioned, to result in the admixture being injected thoroughly into the wetted refractory castable. On information and belief, the addition of the admixture initiates quick-forming chemical bonds that transform the cementitious material into a gel-like state providing body and substance to the refractory castable. In this respect, it is believed that the use of the admixture coagulates the cementitious material into a gelatinous mass enabling spraying and deposition of the refractory on a surface without slumping or sagging. Fluid dispensing ring 150 includes a gas feed line 168 to introduce air into dispensing assembly 16. In this respect, gas feed line 168 is preferably provided to increase the spraying pressure to the refractory material to convey it through nozzle 196 onto the surface to be treated. Specifically, air is introduced under pressure into groove 184 in bushing 180. The pressure of the air is preferably regulated by a user to obtain optimum spraying of the refractory. The pressured air is introduced to the refractory through apertures 186 in bushing 180.

The present invention thus provides a method of applying a clay-free, refractory castable by a dry gunning process. The water required to set the refractory is added to the refractory near a dispensing nozzle. The set modifying admixture, which enables the setting of the material onto the surface to be lined, is added just immediately prior to dispensing the refractory. Air may be injected into the nozzle assembly to provide a boost in propelling the wetted refractory and set modifying admixture onto the surface to be lined.

The invention shall now be further described together with the following examples showing a comparison of gun mix refractories and castable refractories used in accordance with the present invention. The following samples and test results are set forth for illustration only, and proportions are set forth in weight percent unless otherwise indicated.

EXAMPLE I

A test is conducted to contrast the application and properties of a 65% alumina low cement "gun mix" applied by a conventional dry gunning process against a 65% alumina "refractory castable" applied in accordance with the present invention. The compositions of the respective materials are shown in Table I.

TABLE I

Compositions of 65% Alumina Mixes

|  | 65% Alumina Low Cement Gun Mix | 65% Alumina Castable |
|---|---|---|
| 60% Alumina Grain −3/+ 100M | 54.5 | 65.0 |
| Alumina Fines and Superfines | 25.0 | 25.0 |
| Fumed Silica | 7.5 | 5.0 |
| CA Cement | 10.0 | 5.0 |
| Ball Clay | 3.0 |  |
| TOTAL | 100.0 | 100.0 |
| Sodium Naphthalene Sulfonate | +0.15 |  |
| Sodium Polymethacrylate |  | +0.06 |

TABLE I-continued

Compositions of 65% Alumina Mixes

|  | 65% Alumina Low Cement Gun Mix | 65% Alumina Castable |
|---|---|---|
| Sodium Phosphate |  | +0.01 |
| Fibers |  | +0.1 |
| Sodium Silicate Accelerator |  | 20:1 Solution* |

*The 20:1 solution (20 parts water to 1 part sodium silicate by volume) is added at the nozzle.

As can be seen from Table I, a major difference between the "gun mix" and the "refractory castable" is the amount of cement in the respective refractories (the gun mix having approximately twice the amount of cement as the refractory castable) and the absence of ball clay in the refractory castable. Further, the refractory material includes about one half the amount of dispersants than the gun mix (the dispersant in the gun mix being sodium naphthalene sulfonate and the dispersants in the refractory being sodium polymethacrylate and sodium phosphate).

Table II contrasts the physical properties of the set 65% alumina low cement gun mix applied by conventional (Iry gunning techniques and the set 65% alumina refractory castable gunned in accordance with the present invention.

TABLE II

Physical Properties of 65% Alumina Mixes

|  | 65% Alumina Low Cement Gun Mix | 65% Alumina Gunned Castable |
|---|---|---|
| Pre-dampened | yes | no |
| Rebound (%) | 7–10 | 12 |
| Accelerator | none | Sodium Silicate (20:1) |
| Bulk Density (pcf) | | |
| After 230° F. | 147 | 163 |
| After 1500° F. | 142 | 162 |
| After 2000° F. | 143 | 155 |
| After 2500° F. | 141 | 152 |
| Modulus of Rupture (psi) | | |
| After 230° F. | 1600 | 1700 |
| After 1500° F. | 1800 | 3100 |
| After 2000° F. | 1600 | 3000 |
| After 2500° F. | 2100 | 3000 |
| Linear Change (%) | | |
| After 230° F. | −0.1 | −0.1 |
| After 1500° F. | −0.2 | −0.2 |
| After 2000° F. | −0.2 | −0.2 |
| After 2500° F. | +0.2 | +0.2 |

As seen in Table II, the refractory castable as applied according to the present invention provides a material having a greater bulk density at each of the test temperatures, and has a significantly higher modulus of rupture at each of the tested temperatures.

EXAMPLE II

A test is conducted to contrast the application and properties of an 50% alumina low cement "gun mix" applied by a conventional dry gunning process against an 50% alumina "refractory castable" applied in accordance with the present invention. The compositions of the respective materials are shown in Table III.

TABLE III

Compositions of 50% Alumina Mixes

|  | 50% Alumina Low Cement Gun Mix | 50% Alumina Castable |
|---|---|---|
| 47% Alumina Grain –3M | 57.5 | 65.0 |
| Alumina Fines and Superfines | 25.0 | 21.0 |
| Fumed Silica | 7.5 | 6.0 |
| CA Alumina Cement | 10.0 | 8.0 |
| Ball Clay | 3.0 | |
| TOTAL | 103.0 | 100.0 |
| Sodium Naphthalene Sulfonate | +0.15 | +0.15 |
| Fibers | | +0.1 |
| Calcium Chloride Accelerator | | 10:1 Solution* |

*The 10:1 solution (10 parts water to 1 part calcium chloride by weight) is added at the nozzle.

As can be seen from Table III, a major difference between the "gun mix" and the "refractory castable" is the absence of ball clay in the refractory castable.

Table IV contrasts the physical properties of the 50% alumina gun mix applied by conventional dry gunning techniques and the 50% alumina refractory castable gunned in accordance with the present invention.

TABLE IV

Physical Properties of 50% Alumina Mixes

|  | 50% Alumina Low Cement Gun Mix | 50% Alumina Gunned Castable |
|---|---|---|
| Accelerator | none | calcium chloride |
| Bulk Density (pcf) | | |
| After 230° F. | 142 | 150 |
| After 1500° F. | 139 | 147 |
| After 2000° F. | 138 | 144 |
| Modulus of Rupture (psi) | | |
| After 230° F. | 1500 | 3000 |
| After 1500° F. | 1800 | 2100 |
| After 2000° F. | 1800 | 2200 |

The invention as heretofore been described with respect to applying a clay-free, refractory castable using a dry gunning process, and a preferred dispensing assembly is shown in FIGS. 1 and 2.

In a preferred method of dry gunning the refractory castable, the refractory castable does not require pre-dampening. The elimination of pre-dampening eliminates a prior mixing step and allows the user to merely applying the refractory castable in dry form into gun assembly 12. However, when dry gunning a refractory castable without pre-dampening, use of a dispensing assembly as disclosed in FIGS. 1 and 2 is preferred. In this respect, water is added to the dry refractory mix through fluid dispensing assembly 120. The wetted refractory material then passes through conduit 102 wherein the inner surface rifling allows a mixing of the water and refractory material to initiate the binding reaction between the aggregate materials and the calcium aluminate cement. In this respect, conduit 102 allows for an initial mixing and thorough wetting of the refractory material prior to the addition of the set modifying admixture at fluid dispensing ring 150. In this respect, it is preferred that the dry refractory materials have a short mixing period allowing the water to sufficiently wet the refractory material prior to the addition of a set modifying admixture thereto, which set modifying admixture would begin to congeal or conglomerate the refractory material. In the embodiment shown in FIGS. 1 and 2, in addition to adding the set modifying admixture through fluid dispensing assembly 150, air is also added to provide an additional boost when spraying the refractory material. The addition of air may or may not be required based upon the type of refractory as well as the type of set modifying admixture added to the refractory.

FIG. 3 shows an alternate embodiment of a dispensing assembly wherein no additional air is added to the refractory material prior to dispensing the material from nozzle 196. It will of course be appreciated that the dispensing assembly 16 shown in FIGS. 1 and 2 could be used in spraying a refractory material without the addition of air by merely eliminating air flow through air conduit 168. However, to avoid clogging apertures 186 in a dispensing assembly such as shown in FIG. 2 when air is not being inserted, it would be preferable to provide a dispensing assembly as shown in FIG. 3 wherein two like fluid dispensing assemblies 120 are used in conjunction with conduit 102. In this respect, FIG. 3 illustrates the modular concept of one aspect of the present invention by using like fluid dispensing rings 120 wherein feed line 146 on dispensing assembly 120 adjacent transfer hose 14 is connected to a source of water and feed line 146 of fluid dispensing assembly 120 adjacent nozzle 196 is connected to a metering device and a source of a set modifying admixture.

FIG. 4 shows an alternate embodiment of the present invention wherein a fluid dispensing assembly 150 is attached to the transfer hose 14. In this embodiment, feed line 162 of fluid dispensing assembly 150 is connected to a water source (i.e., water source and metering pump assembly) to provide water to the dry refractory material. In this embodiment, a flexible hose designated 102' connects fluid dispensing assembly 150 to a fluid dispensing assembly 120 disposed adjacent dispensing nozzle 196. In this respect, flexible hose 102' becomes the conduit for conveying the wetted refractory material from fluid dispensing assembly 150 to fluid dispensing assembly 120 where a set modifying admixture may be added. Because the flexible hose 102' would not have the surface contours (i.e., the internal rifling) of the solid conduit 102, air may be introduced through fluid dispensing assembly 150 to cause the wetted refractory material to be agitated as it is conveyed through flexible hose 102'. In this respect, the air pressure in addition to initially agitating the wetted refractory forces the wetted refractory along a generally nonlinear path to fluid dispensing assembly 120. Such arrangement would allow for larger spacing between the initial wetting of the refractory material and dispensing nozzle 196 where the set modifying admixture is added to the refractory. FIG. 4 thus illustrates another embodiment of a refractory dispensing assembly which can be created by the modular components described above.

FIG. 5 illustrates a further modification to fluid dispensing assembly 120. In FIG. 5, the fluid dispensing assembly designated 220 is modified to include a air feed line 222 which is in communication with fluid feed line 146. With such an arrangement, fluid, albeit water or a set modifying admixture, may be introduced into the refractory material together with air to both agitate and provide a boost when spraying the refractory material.

As heretofore described, when dry gunning a refractory castable, it is preferable to add water to the refractory material and allow for mixing of the water and refractory material before adding a set modifying admixtures. Preferably, the set modifying admixture is of a type which will have a rapid effect on the refractory castable so as to prevent slumping and sagging when the refractory material is sprayed onto a surface. However, some set modifying admixtures may have a slower effect on the refractory material, in which case, an accelerator material may be added prior to of the dispensing nozzle and requires some mixing with the refractory material before exhibiting a gelling or congealing effect.

Figure 6A:
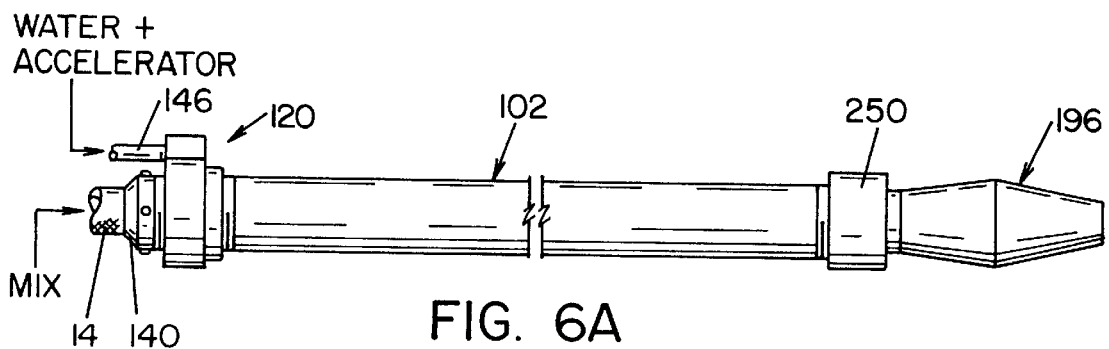
FIGS. 6A, 6B, 6C and 6D are schematic views of gunning nozzles illustrating alternate embodiments of the present invention.
Figure 6B:
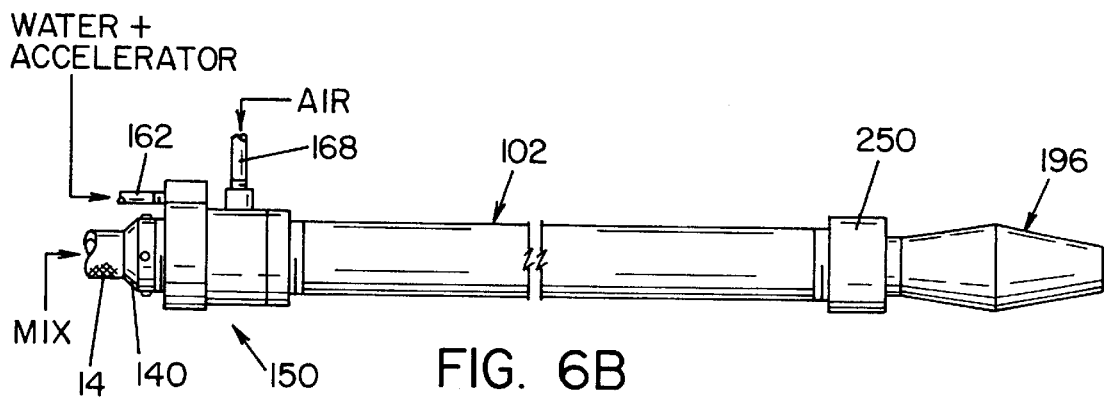
Figure 6C:
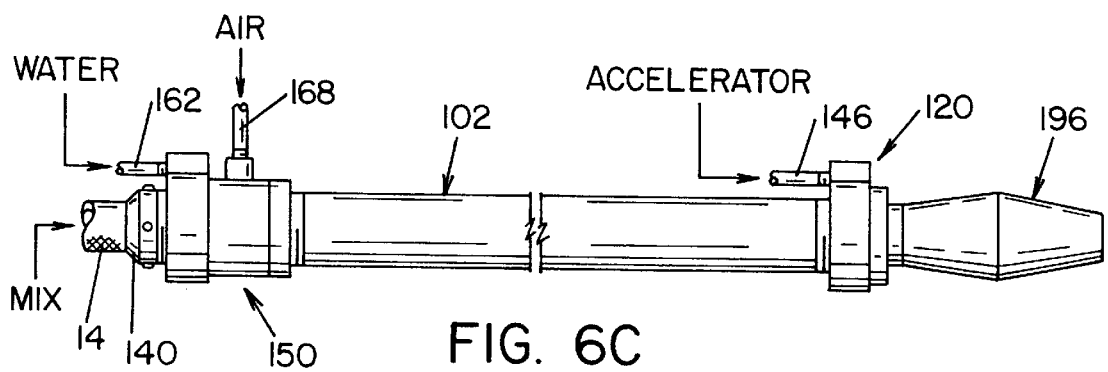
Figure 6D:
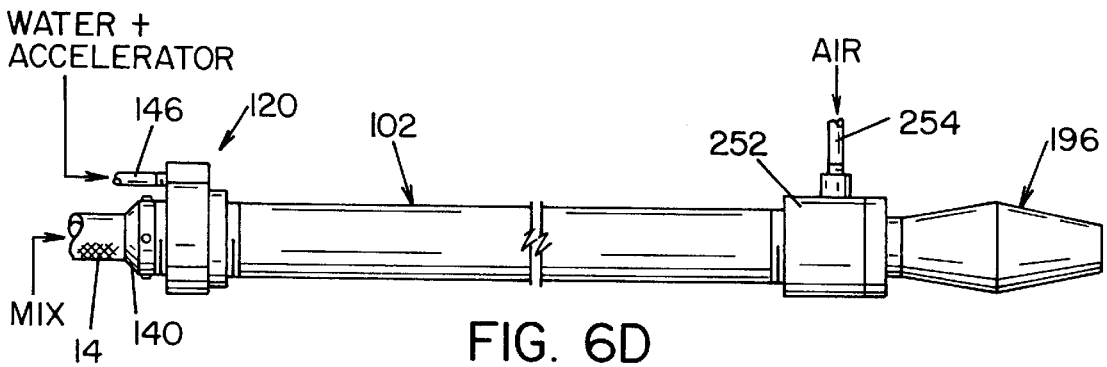

FIGS. 6A–6D show refractory dispensing assemblies utilizing fluid dispensing assemblies 120, 150 as heretofore described in various combinations to produce different types of dispensing apparatus which may be used in different situations. In FIGS. 6A and 6B, water and a set modifying admixture are added prior to the dispensing nozzle 196 and passed through conduit 102 before reaching dispensing nozzle 196. Conduit 102 may be a solid pipe having internal rifling as disclosed in FIGS. 2 and 3, or may be a flexible tube as disclosed in FIG. 4. Both arrangements allow for more complete mixing of the refractory castable and water prior to spraying by nozzle 196. Preferably, the length of conduit 102 is between 1 to 10 feet in length for the dispensing assemblies heretofore described. As will be appreciated, a flexible tube is more suitable for a longer conduit 102, whereas a solid pipe having internal surface means to create a mixing action is preferable for a shorter conduit 102. In the embodiments shown in FIGS. 6A and 6B, a threaded coupler 250 is used to connect nozzle 196 to conduit 102. The dispensing assemblies as shown in FIGS. 6A–6D show further usage of the modular concept disclosed in the present invention.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A process for applying a dry refractory castable onto a surface, comprising the steps of:
    a) introducing metered amounts of a clay-free, dry refractory castable into a delivery hose, said dry refractory castable comprised of:
        about 50–75% by weight of refractory aggregate,
        about 10–40% refractory powders,
        less than 10% calcium aluminate cement, and
        about 0–2% dispersant;
    b) conveying said dry refractory under pneumatic pressure through said delivery hose to a dispensing assembly having a first end for receiving said dry refractory from said delivery hose, a second end having a nozzle thereon for dispensing said refractory and a chamber between said first end and said second end;
    c) introducing streams of water under pressure into said dry refractory after said dry refractory castable exits said delivery hose, said water being added at the first end of said dispensing assembly to create a wetted refractory castable;
    d) conveying said wetted refractory through said chamber in said dispensing device to allow mixing of said refractory castable and said water;
    e) introducing a set modifying admixture selected from the group consisting of hydrated lime, sodium silicate and calcium chloride into said refractory in said dispensing assembly prior to dispensing said refractory from said dispensing assembly; and
    f) spraying said wetted refractory castable onto a surface.

2. A process as defined in claim 1, wherein said dispensing assembly is comprised of:
    a first fluid dispensing assembly at said first end for introducing water into said dry refractory castable;
    a conduit following said first fluid dispensing assembly to allow wetting of said refractory castable;
    a nozzle at said second end for dispensing said wetted refractory castable; and
    a second fluid dispensing assembly preceding said nozzle for introducing a set modifying admixture to said refractory castable prior to spraying from said nozzle.

3. A process as defined in claim 1, wherein said refractory castable applied by steps a) through f) has a bulk density greater than about 140 pcf and has a modulus of rupture greater than about 2000 psi after heating to temperatures above 1500° F.

4. A process as defined in claim 2, wherein said conduit has internal surface means to facilitate mixing of said refractory castable.

5. A process for applying a refractory castable to a surface, comprising the steps of:
    a) introducing into a delivery hose a metered amount of a clay-free, dry refractory castable having an alumina content of about 40 to 95% by weight;
    b) conveying said dry refractory under pressure through said delivery hose to a dispensing assembly having a first end for receiving said dry refractory from said delivery hose, a second end having a nozzle thereon for dispensing said refractory and a chamber between said first end and said second end;
    c) introducing streams of metered amounts of water under pressure into said dry refractory after said dry refractory castable exits said delivery hose, said water being added at the first end of said dispensing assembly to create a wetted refractory castable;
    d) conveying said wetted refractory through said chamber in said dispensing device to allow mixing of said refractory castable;
    e) introducing a set modifying admixture selected from the group consisting of hydrated lime, sodium silicate and calcium chloride into said refractory in said dispensing assembly prior to dispensing said refractory from said dispensing assembly; and
    f) spraying said wetted refractory castable onto a surface.

* * * * *